Jan. 25, 1938.  H. M. PFLAGER  2,106,359
CAR TRUCK
Filed July 16, 1934  3 Sheets-Sheet 1
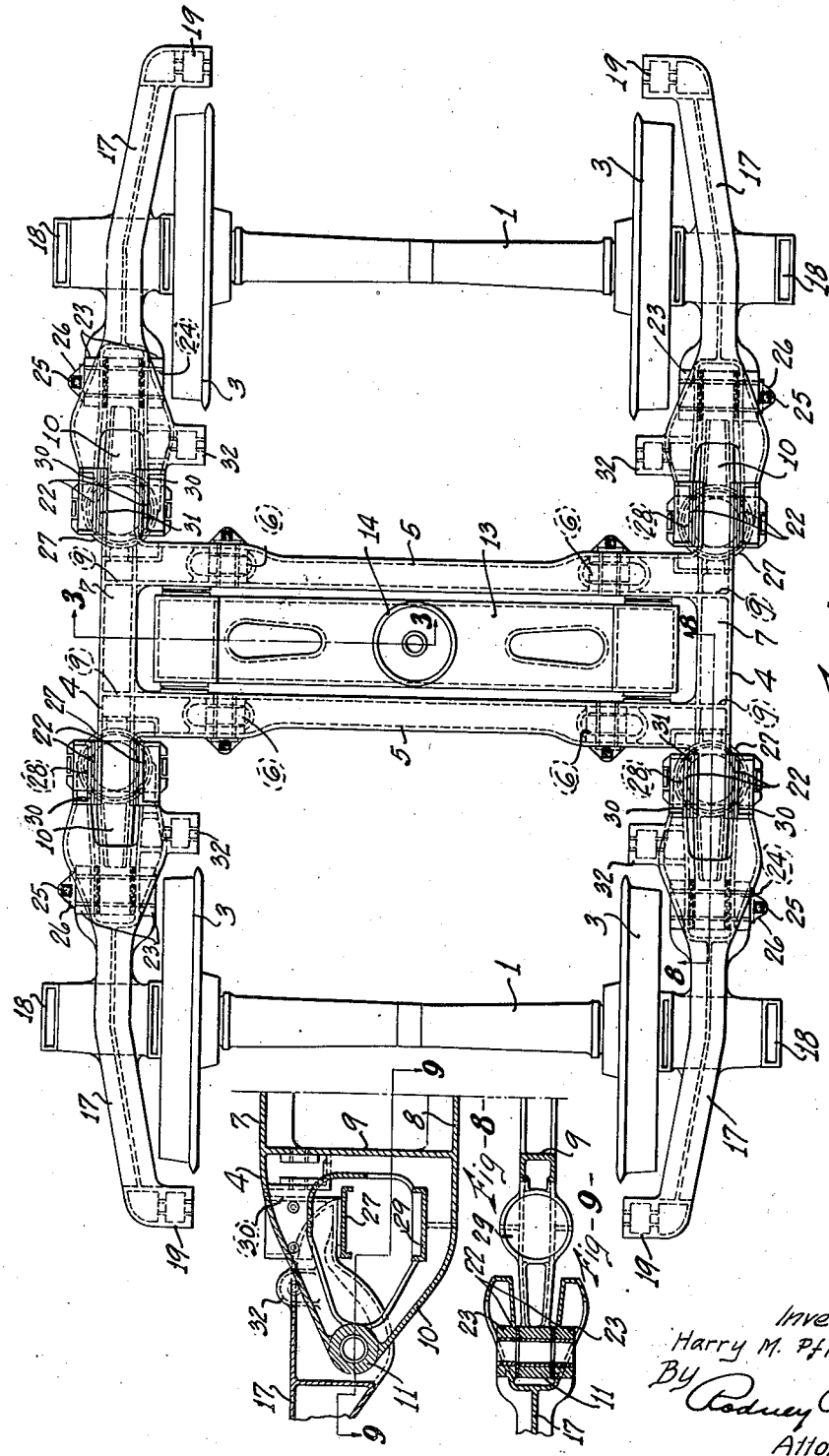
Inventor
Harry M. Pflager.
By Rodney Bedell
Attorney

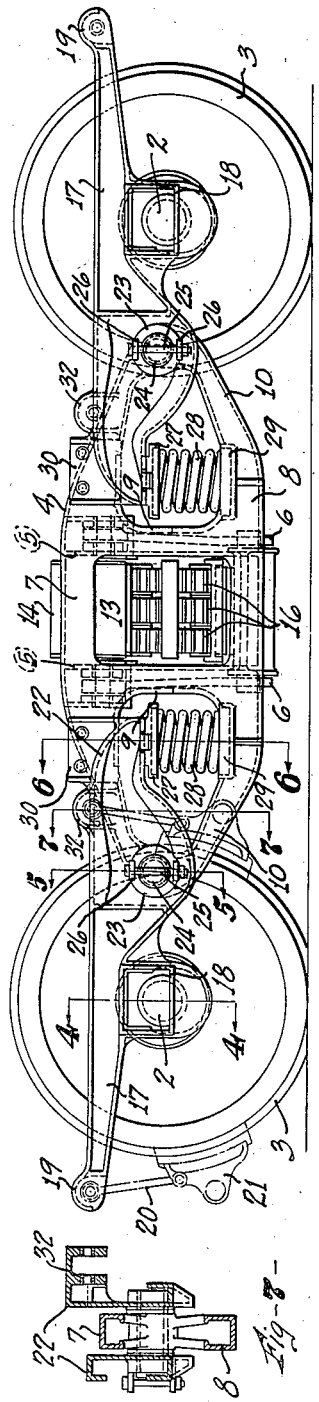

Jan. 25, 1938.     H. M. PFLAGER     2,106,359
CAR TRUCK
Filed July 16, 1934     3 Sheets-Sheet 3
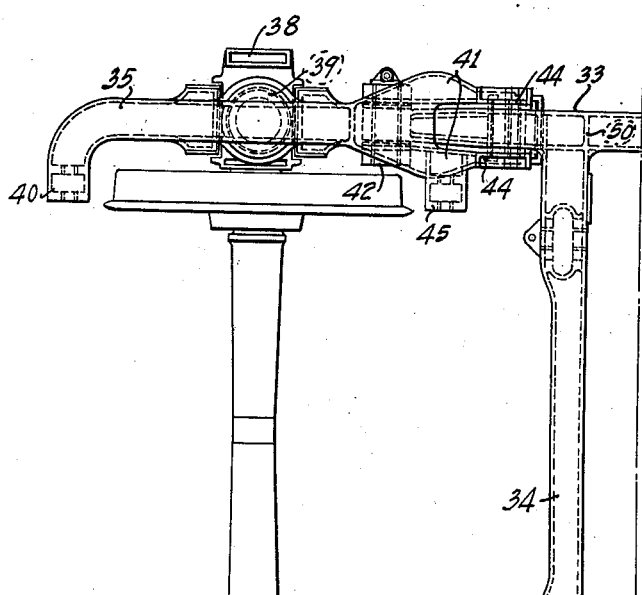
Fig-10-
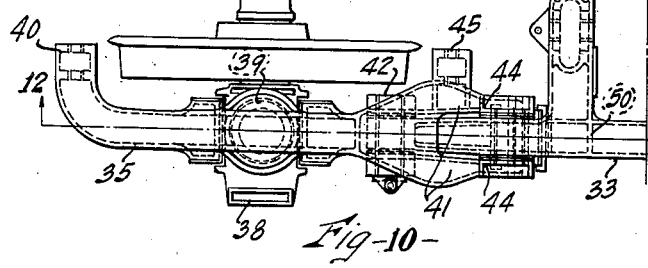
Fig-11-
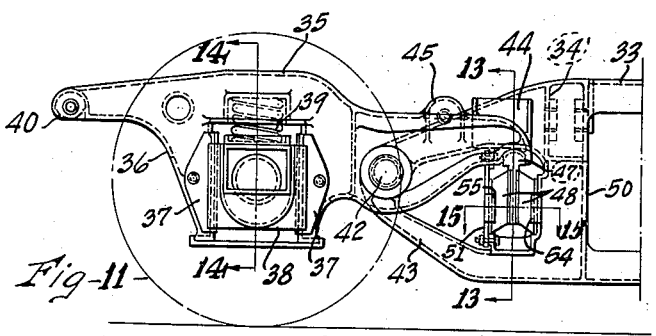
Fig-12-
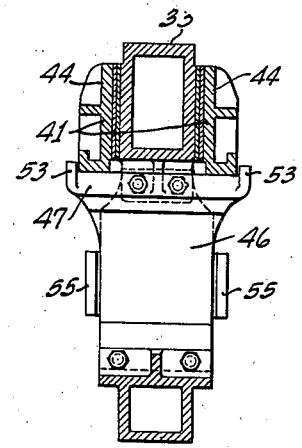
Fig-13-
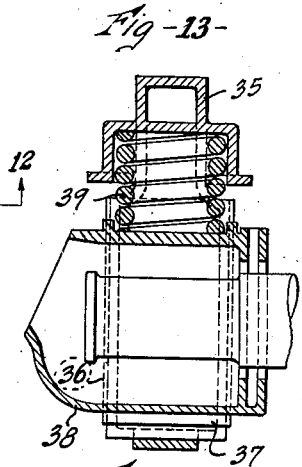
Fig-14-
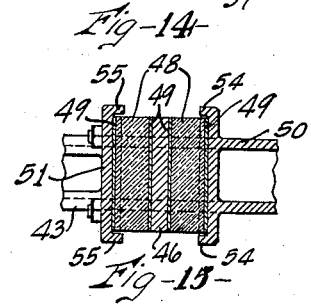
Fig-15-
Inventor
Harry M. Pflager.
By Rodney Bedell
Attorney Patented Jan. 25, 1938

2,106,359

UNITED STATES PATENT OFFICE 2,106,359

CAR TRUCK

Harry M. Pflager, St. Louis, Mo., assignor to General Steel Castings Corporation, Granite City, Ill., a corporation of Delaware Application July 16, 1934, Serial No. 735,336

15 Claims. (Cl. 105—194)

This invention relates to railway rolling stock and consists in a novel four-wheel truck for cars.

Previously four-wheel trucks for passenger cars or other service, where easy riding qualities are desired, have embodied equalizers each extending from journal box to journal box at one side of the car and mounting spaced springs supporting the truck frame. The side members of the frame extend from end to end of the truck and include pedestals slidably receiving the journals and also include brackets for supporting the brake hangers.

The substantial relative vertical movement between the truck frame and the journal boxes has resulted in friction and wear between the journal boxes and the pedestals. This relative vertical movement also tends to produce unequal brake pressures when the brakes are applied. The brake heads are located below the horizontal center line of the wheel. When there is relative movement between the wheels and the truck frame, the brake heads suspended from the latter move toward and away from the vertical center line of the wheel. Downward movement of the brake heads away from the horizontal center line of the wheel during the braking operation reduces the brake pressure because the brake heads move toward the vertical center line of the wheel. If the brake heads move upwardly toward the horizontal center line, the brake pressure is increased because they move away from the vertical center line due to the curvature of the wheel. This results in uneven riding and braking conditions.

An object of the present invention is to eliminate or reduce the undesirable effects mentioned as resulting from the relative movement of the truck frame and journal boxes in the above described structure without sacrificing any of the easy riding qualities attending this type of structure.

Another object is to provide a truck which is simpler and lighter in weight than previous equalized four-wheel trucks while retaining or exceeding the smooth riding qualities thereof.

Another object is to provide rigid and strong frame and equalizing structures for railway trucks.

These objects and others are attained by the structures illustrated in the accompanying drawings in which—

Figure 1 is a top view of a truck illustrating the invention.

Figure 2 is a side view of the same.

Figure 3 is a half vertical transverse section taken on the line 3—3 of Figure 1.

Figures 4, 5, 6, and 7 are vertical sections taken on the corresponding section lines of Figure 2.

Figure 8 is a partial vertical longitudinal section taken on the line 8—8 of Figure 1.

Figure 9 is a partial horizontal section taken on the line 9—9 of Figure 8.

Figure 10 is a half top view of a truck illustrating a modified form of the invention.

Figure 11 is a half side view of the same.

Figure 12 is a vertical longitudinal section taken on the line 12—12 of Figure 10.

Figures 13 and 14 are vertical longitudinal sections taken on the corresponding section lines of Figure 11.

Figure 15 is a detail horizontal section taken on the line 15—15 of Figure 11.

In Figures 1 to 9 is illustrated a four-wheel truck including axles 1, having journals 2, and wheels 3. Located between the axles is a framing structure including side frame or wheel piece trusses 4 rigidly connected by box-shaped transoms 5 mounting the bolster swing hangers 6. Each side frame is formed of generally channel-shaped top and bottom members 7 and 8 and vertical struts 9, members 7 and 8 converging as at 10 to form bearings 11 for a purpose to be described hereafter. The transoms 5 are aligned with the struts 9 and the lower walls of the transoms merge with the inner walls of the struts in arches, as at 12 in Figure 3. The entire frame structure is conveniently, though not necessarily, formed, as shown, as an integral casting.

Located between the transoms 5 is the bolster 13 having center plate 14 and carried by the swing hangers 6 through the usual spring plank 15 and elliptic springs 16 extending laterally through the space between side frame struts 9.

Carried directly on each journal 2 is a combined equalizer and journal box member including the horizontal bar 17 and integral journal box 18. At one end, each bar 17 includes a bracket 19 from which is suspended the brake hanger 20 and brake head 21. At the other end each bar 17 is forked, as at 22, and straddles the adjacent converging end portion of the side frame. The fork 22 has perforated bosses 23 mounting a pin 24 which also extends through bearing 11 in the side frame and is secured in place by a bolt 25 engaged in lugs 26 projecting outwardly from the equalizer. Pins 24 constitute pivotal connections of the equalizers with the side frame trusses.

Mounted on the under portions of the forks 22 are the spring caps or disks 27, seating coiled springs 28 which at their lower extremities rest upon spring seats 29 formed integral with the side frame bottom members 8. Springs 28 form yielding connections between the equalizers and side frames, cooperating with the pivotal mountings 23, 24 to stabilize the truck while serving to equalize shocks on the axles and producing smooth riding qualities. As shown in Figure 6, the inner walls of the jaws of forks 22 are extended upwardly, as at 30, and these extensions and the abutting walls of side frame top members are provided with liners 31 to provide for wear due to chafing of the parts during the slight pivoting of the equalizers about the journals 2 and pivots 24. Projecting upwardly and inwardly from the inner jaws of forks 22 are brake hanger brackets 32.

Since the brake hanger brackets 19 and 32 are formed rigid with the combined equalizer and journal box structures, the brake shoes maintain the same radial relations with the wheel center and wheel tread under the spring action. Thus braking pressures are applied evenly over the surfaces of the shoes, producing smooth braking action and even wear on the shoes.

Figures 10 to 15 illustrate another truck provided with an equalizer and journal box structure which is a modification of the structure shown in Figures 1 to 9. In this construction the equalizers are provided with pedestals for receiving the journal boxes and to permit the latter to move vertically therein. While the brake heads are hung from the equalizer and have relative vertical movement with respect to the wheel, this is an improvement over previous 4-wheel trucks, as the equalizers are pivotally connected to the truck frames and tend to move with the wheels independently of the truck frame, thus reducing the amount of relative vertical movement between the brake heads and the wheels.

In Figures 10 to 15, the side frame trusses 33 and transoms 34 are similar to the corresponding parts of the previous form. Each equalizer bar 35 includes pedestal 36 provided with liners 37 slidably receiving the journal box 38. Seated on the journal boxes are coiled springs 39 supporting the equalizers. The bars 35 at one end include brake hanger brackets 40 and at the other end are forked as at 41 and are pivoted at 42 to the converging ends 43 of the side frames. Forks 41 include chafing structure 44 and brake hanger brackets 45 as in the previous form.

Connecting the inner end of each equalizer with the side frame is a dampening device or shock absorber including plate 46, with an enlarged head 47 seated against the under part of fork 41, and mounted between inclined rubber blocks 48. The blocks 48 have metal liners 49 seated against the adjacent side frame strut 50, plate 46, and a plate 51 bolted to lugs 52 projecting from the top and bottom members of the side frame truss. Flanges 53 on head 47 and flanges 54 and 55 on strut 50 and plate 51, respectively, assist in maintaining the shock absorber assembly.

Both forms of the invention are simpler and lighter of construction than previous four-wheel equalized trucks, due, in part, to elimination of parts of the equalizers and side frames which heretofore have been coextensive for the entire distance between the axles. At the same time the truck is rugged and durable and easy riding. Various parts shown formed integral, may be separately formed and bolted, riveted, or welded together, if desired. The structures illustrated may be modified in these respects and others which will occur to those skilled in the art without departing from the spirit of the invention, and the exclusive use of all such modifications which come within the scope of the appended claims is contemplated.

I claim:

1. In a railway truck, an axle, a side frame, an equalizer having a part carried on said axle and a part spaced therefrom, said equalizer being pivoted between said parts on said frame, and an individual resilient connection between said last-mentioned part and said frame, said side frame terminating adjacent its pivotal connection with said equalizer and said equalizer being forked so as to straddle said side frame.

2. In a railway truck, an axle, a side frame having a spring seat, an equalizer having a portion carried on said axle and a part spaced inwardly therefrom and straddling said frame, a spring cap on said part alined vertically with said spring seat, a spring compressed between said cap and said seat, and a pivotal connection between said frame and equalizer.

3. In a four-wheel truck, spaced axles, two independent rigid equalizers on each side of the truck, each mounted for swiveling movement on one of said axles and extending towards the other axle, and a truck frame carried by said equalizers and comprising comparatively short side members pivoted to intermediate portions of said equalizers, and resilient connections between said frame and the inner portions of said equalizers.

4. A railway truck side frame in the form of a rigid truss with upper and lower members having converging end portions each including bearings for equalizer pivots, there being a spring seat on said lower member spaced inwardly from its end portion.

5. In a railway truck truss type side frame, longitudinally spaced struts forming an opening between them for receiving the end of the bolster spring, bearings for equalizer pivots, and equalizer spring seats between said struts and said bearings.

6. In a railway truck side frame in the form of a truss, converging top and bottom members forming bearings for equalizer pivots, and equalizer spring seats on said bottom members.

7. In a railway truck, an axle, a journal box thereon, a side frame, an equalizer including pedestal structure slidably receiving said journal box and also including a pivotal connection with said side frame, and a yielding anchorage for said equalizer spaced from said journal box.

8. A truck as specified in claim 7 which includes yielding means supporting said equalizer on said journal box.

9. Structure as specified in claim 7 in which said equalizer extends outwardly from said side frame and includes a portion straddling the end of said side frame and yieldingly connected therewith.

10. Structure as specified in claim 7 in which said equalizer includes a portion extending beyond said pivotal connection in a direction opposite said pedestal and connected to said side frame by means of a shock absorbing device.

11. In a railway truck, spaced axles, journal boxes thereon, a truck side frame shorter than the distance between said axles, equalizers with their outer portions yieldingly carried on said journal boxes and their inner portions yieldingly connected to said side frame, and pivotal connections between said side frame and said equalizers intermediate the ends of the latter.

12. In a railway truck, spaced axles, journal boxes thereon, a truck side frame shorter than the distance between said axles, helical springs on said journal boxes, equalizers with their outer portions carried on said springs and their inner portions anchored to said frame, pivotal connections between said frame and said equalizers intermediate the ends of the latter, and oscillation dampening means associated with said equalizers.

13. In a railway truck, spaced axles, spaced side frames having a length less than the distance between said axles, rigid equalizer and journal box members each pivoted between its ends to a corresponding end of one of said side frames, and means yieldingly connecting said side frames and the inner ends of said members independently of the other of said members, transoms between said side frames, links pivotally suspended from said transoms, and a swing bolster carried by said links.

14. In a railway truck, spaced axles, spaced side frames terminating between said axles, equalizers each carried on one of said axles and extending towards the other axle and terminating short of the other equalizer on that side of the truck, each equalizer being pivoted between its ends on one of said frames, and an individual yielding connection between its inner end and said frame, and a lateral motion bolster carried by said frame.

15. In a railway truck, axles, journal boxes thereon, spaced side frames each comprising a truss including top and bottom members and struts between the same, said top and bottom members converging at their ends to form pivot bearings spaced from said boxes and struts, equalizers and yielding elements supporting said side frames from said boxes through said pivot bearings, and spaced transoms rigidly connecting said side frames, said transoms including portions at the level of the top members of said side frames and the end portions of said transoms merging with the upper and lower portions of said struts.

H. M. PFLAGER.